United States Patent [19]
Duchatellier

[11] 3,863,306
[45] Feb. 4, 1975

[54] PIVOTABLE MOUNTING CLIP

[75] Inventor: Bernard C. Duchatellier, Paris, France

[73] Assignee: Rapid S. A., Paris, France

[22] Filed: Mar. 7, 1973

[21] Appl. No.: 338,780

[30] Foreign Application Priority Data
Apr. 13, 1972 France .............................. 72.13000

[52] U.S. Cl. ............................. 24/252 B, 240/151
[51] Int. Cl. ....................... A44b 21/00, F21v 17/00
[58] Field of Search ......... 24/248 JE, 248 E, 248 L, 24/252 B, 252 J; 240/73 LD, 73 BC, 73 R, 151

[56] References Cited
UNITED STATES PATENTS

| | | | |
|---|---|---|---|
| 1,892,918 | 1/1933 | Waller | 24/252 B |
| 2,172,248 | 9/1939 | Kost | 240/151 |
| 2,943,187 | 6/1960 | Schwartz | 240/151 |
| 3,014,126 | 12/1961 | Endelson | 240/73 R |
| 3,484,909 | 12/1969 | Saver | 24/252 J |

*Primary Examiner*—Donald A. Griffin
*Attorney, Agent, or Firm*—Teagno & Toddy

[57] ABSTRACT

A mounting clip including a generally V-shaped angle piece pivotably mounted to a stirrup piece. The stirrup piece includes a resilient positioning member integral therewith. The resilient positioning member provides a stop to control the attitude of the angle piece in the open position thereof and resiliently retains the angle piece in the closed or mounting position thereof.

14 Claims, 4 Drawing Figures

PIVOTABLE MOUNTING CLIP

BACKGROUND OF THE INVENTION

1. Field of the Invention

The present invention relates to mounting clips or fasteners and more particularly to a two-piece pivotal mounting clip for releasably mounting a shade or globe to a light fixture.

2. Description of the Prior Art

The prior art includes many fasteners or clips for the releasable mounting of shades or globes to light fixtures. With the use of such fasteners it is possible to mount a shade, globe or other translucent or transparent member to a light fixture which has been previously mounted on a ceiling or wall. Many of such prior art fasteners included a rim with several set screws each of which must be tightened or loosened to releasably mount or remove the globe to or from the fixture. Such fasteners require a time consuming mounting or releasing operation, provide the opportunity for the loss or misplacement of the screws and also are highly visible from the exterior of the fixture.

The prior art also includes fasteners for the above use which comprise a pivotal member mounted in a stirrup which has an open position for receiving the globe and a closed position in which the globe is firmly held against the light fixture. While such fasteners are well suited for the above-mentioned use, they do, however, have certain drawbacks such as a tendency to damage or break the glass globes, they are usually visible from the exterior of the globe which might have an unpleasing aesthetic effect and they may also require a complicated and relatively expensive release mechanism.

SUMMARY OF THE INVENTION

In accordance with the present invention, the drawbacks of the prior art have been overcome to the extent that a pivotal mounting clip is provided which will releasably mount a glass globe to a light fixture by simply inserting the globe in the clip and then pushing the globe towards the fixture, will be totally interior of the mounted globe and thus not visible when the globe is mounted and includes a simple and inexpensive integral resilient positioning or release member. The above is accomplished by utilizing a two-piece, stamped structure comprising a stirrup which may be integral with or mounted to the fixture box and a generally V-shaped angle member pivotally mounted in the stirrup. A resilient positioning mechanism, which is integral with the stirrup, will engage the angle member in the open position to properly receive the globe and will retain the angle member in the closed position to resiliently retain the globe against the fixture. The positioning mechanism is of a proper resiliency to apply a force on the angle piece to firmly retain the globe against the fixture while not exerting a damaging force thereon.

Accordingly, it is an object of the present invention to provide a new and improved pivotal mounting clip.

Another object of the present invention is to provide a new and improved clip comprising two stamped pieces for resiliently, removably retaining a globe or light shade to a light fixture.

A further object of the present invention is to provide a new and improved clip for the removable mounting of a globe to a light fixture which will be totally interior of the mounted globe.

These and other objects and advantages of the present invention will become apparent from a reading of the following detailed description of the preferred embodiment taken in connection with the attached drawings.

DESCRIPTION OF THE PREFERRED EMBODIMENT

The fastener or mounting clip of the present invention may be seen by reference to FIGS. 1 through 4. In the present description of the preferred embodiment the mounting clip is shown as releasably mounting a globe 20 to a light fixture 3. It is understood that the terms light fixture and light fixture box may apply to any member to which a second member may be mounted and the term globe may apply to any member having an inwardly extending flange to be mounted to a first member. Thus, the terms light fixture, light fixture box and globe are used for illustrative purposes only and are not intended to limit the scope of the present invention.

Figure 3:
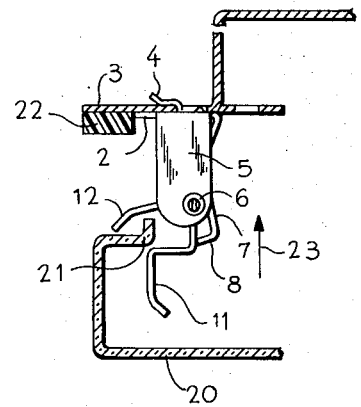
FIG. 3 is a side view of the fastener of the present invention in the open position receiving a globe to be resiliently mounted to a light fixture.
Figure 4:
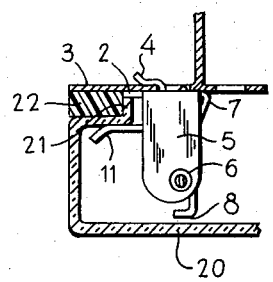
FIG. 4 is a side view of the fastener of the present invention in the closed position resiliently mounting a globe to a light fixture.

The present invention is comprised of two parts preferably stamped from suitable sheet metal which is then folded in a suitable manner, these two parts respectively forming the stirrup 1 and the angle piece 10. More specifically, stirrup 1 includes a base 2 which can be hooked to the box of a light fixture 3, such as schematically shown in FIGS. 3 and 4, by means of tabs 4 or like fastening means as is well known in the art. The stirrup 1 may also be integral with the light fixture box 3. Base 2 of the stirrup 1 includes two generally parallel branches or arms 5 between the ends 6 of which there is pivotably mounted the angle piece 10. Stirrup 1 further includes a resilient tab or positioning member 7 integral with base 2 of the stirrup which has at its free end a folded part 8 as is clearly seen in FIGS. 2 and 4. The elastic tab or resilient positioning member 7 is folded at a generally 90° angle to the base 2 as is better seen in FIG. 2, and its connection with the base 2 of stirrup 1 is reinforced by gussets 9 or the like which are simply obtained by stamping or bending the metal on the external part of the stirrup and at the line of the fold as is well known in the art as a reinforcing means for sheet metal parts. Angle piece 10 which pivots in the stirrup 1 includes two branches or legs which form a generally V-shaped part, a lower leg 11 and an upper leg 12. These two legs are formed by simply folding the angle piece 10 along a fold line 15. The fold line is extended by means of two small shafts which extend from the fold line on each side of the angle piece 10. The small shafts are adapted to be pivotably received in the ends 6 of the branches 5 of the stirrup to pivotably mount the angle piece 10 in the stirrup 1.

Figure 1:
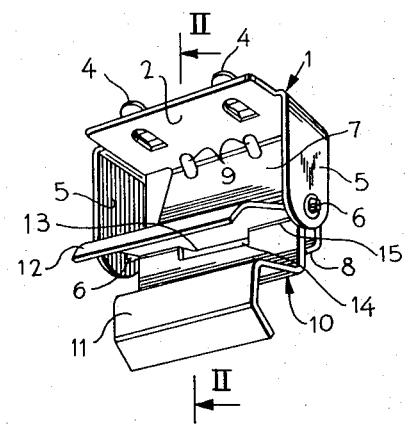
FIG. 1 is a perspective view of the fastener of the present invention.
Figure 2:
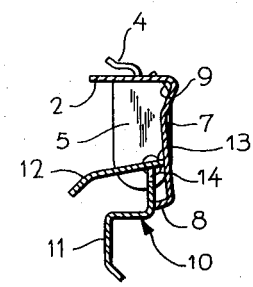
FIG. 2 is a side sectional view of the fastener of the present invention taken along the line II—II in FIG. 1.

As can be seen in FIGS. 1 and 2 the upper leg 12 of the angle piece 10 has a substantially coplanar heel or extension 13 formed by a cutout portion 14 of the lower leg 11 at the level of the fold line 15. Thus, the heel 13 constitutes an extension of the upper leg 12 of the angle piece. As will be described in more detail below and as can be seen in FIG. 2, the elastic tab or resilient positioning means 7 cooperates with heel 13 in the closed or mounting position of the angle piece.

It can be seen in the FIGS. that legs 11 and 12 of angle piece 10 are slightly folded or angularly shifted to render easier the inserting of the light globe into the angle piece. It is evident that the shape of the legs of angle piece 10 may be modified to receive various types of members to be mounted without departing from the scope of the present invention.

The operation of the mounting clip of the present invention will now be described in more detail and may be more clearly seen by reference to FIGS. 3 and 4. The mounting clip first of all is hooked by means of its tabs or hooks 4 to the light fixture box 3 which has first been mounted in a ceiling or wall as is clearly shown in FIGS. 3 and 4. The mounting clip in the open position as is shown in FIG. 3, is in proper attitude to receive globe 20 which is presented under the fixture in a manner such that the inwardly extending flange 21 can be caught between the legs 11 and 12 of the angle member 10. It is noted that the angle member 10 is held in the proper open position or attitude to receive the globe 20 by means of folded end 8 of the resilient positioning means 7 which bears against the lower leg 11. In order to resiliently mount globe 10 to light fixture 3 it is sufficient to simply push the globe upward toward the fixture, as is represented by arrow 23 in FIG. 3. The globe will thus reach its final position of assembly or its removably mounted position represented in FIG. 4. It can be seen that a cushion 22 of a soft material, such as foam, is advantageously provided on the light fixture box to serve as a buffer between the light fixture and the inwardly extending flange 21 of the globe. The pad or cushion 22 will thus insure a tight assembly of the globe to the light fixture while absorbing the shock of the assembling operation. In the closed or mounting position, leg 11 of the angle piece 10 will resiliently urge the globe 20 into contact with the fixture 1 while the heel 13 and body of leg 12 will be resiliently engaged by the resilient positioning member 7 to retain the angle member in its closed position. The globe may be released by simply exerting a sufficient downward force on the globe to cause heel 13 to cammingly force the resilient positioning member 7 outward allowing the angle member to return to the open position.

It can therefore be seen that the fastener or mounting clip of the present invention is relatively simple and solely composed of two parts which by themselves are sufficient to provide a predetermined open position of the angle member 10 to receive the globe and a closed position of the angle member 10 to resiliently mount the globe to the fixture. The mounting clip thus allows a simple removable mounting operation and also is totally interior of the mounted globe and thus not visible when the globe is mounted.

Although this invention has been described in its preferred form with a certain degree of particularity, it is understood that the present description of the preferred form has been made by way of example only and that numerous changes in the details of construction and combination of the parts may be resorted to without departing from the spirit and scope of the invention as hereinafter claimed.

I claim:

1. A two-piece clip for releasably mounting a first object having an inwardly extending flange to a second object, said clip comprising:
   a stirrup member mountable to said second object, said stirrup member including a pair of substantially parallel arms and an integral resilient positioning means; and
   a generally V-shaped angle member pivotably mounted to said stirrup member, said angle member comprising a first and second leg and a shaft extending from each side of the angle member at the tip of the V, each shaft being received in an aperture of an arm of said stirrup member, said angle member having a first position for receiving the flange of the first object between the legs of the V and a second position for resiliently urging said flange against said second object, in the first position of said angle member said first leg engaging said resilient positioning means and said second leg providing a surface against which said flange may act as a result of said first object being urged towards said second object to pivot said angle member and in the second position of said angle member said first leg resiliently urging said flange against said second object and said second leg resiliently engaged by said resilient positioning means to maintain said angle member in said second position.

2. The two-piece clip of claim 1 wherein said second leg has a substantially coplanar portion extending beyond the tip of the V, said second leg being in substantially flush contact with said resilient positioning means when said angle member is in said second position.

3. The two-piece clip of claim 2 wherein said substantially coplanar portion of said second leg is formed from a cutout portion of said first leg.

4. The two-piece clip of claim 3 wherein said stirrup has a substantially flat base for mounting substantially parallel to a surface of said second object and said arms extend substantially perpendicularly from said base.

5. The two-piece clip of claim 4 wherein said resilient positioning means extends substantially perpendicularly of said base and lies in a plane substantially parallel to a line joining the apertures in said arms.

6. The two-piece clip of claim 5 wherein said stirrup member and said angle member are sheet metal stampings.

7. The two-piece clip of claim 6 wherein said integral resilient positioning means comprises a bent portion of said base, the line of fold between said base and said resilient positioning means being reinforced by means of structural indentations.

8. The two-piece clip of claim 5 wherein said first object is a light fixture globe and said second object is a light fixture box.

9. The two-piece clip of claim 8 wherein said clip is entirely internal of said globe when said globe is retained by said clip in said second position.

10. The two-piece clip of claim 9 wherein said stirrup is integral with said light fixture box.

11. The two-piece clip of claim 8 wherein said light fixture box carries at least one resilient pad which will be interposed said globe and said fixture box when said globe is mounted to said fixture box.

12. The two-piece clip of claim 8 wherein said globe is resiliently mounted to said light fixture box by simply placing said globe between the legs of said V-shaped angle member and then urging said globe towards said light fixture box until the second leg of said V-shaped angle member is resiliently abutted by said resilient positioning means.

13. The two-piece clip of claim 12 wherein said globe is removed from said light fixture box by simply urging said globe away from said light fixture box causing said extension of said second leg to cammingly displace said resilient positioning means allowing said angle member to assume said first position.

14. The two-piece clip of claim 1 wherein said second leg has a substantially coplanar portion extending beyond the tip of the V, said extension formed from a cut-out portion of said first leg and said stirrup member is formed integral with said second object.

* * * * *